March 7, 1939.  M. D. KENNEDY ET AL  2,149,443
FRUIT AND VEGETABLE TREATING MACHINE
Filed Feb. 3, 1934   2 Sheets—Sheet 1
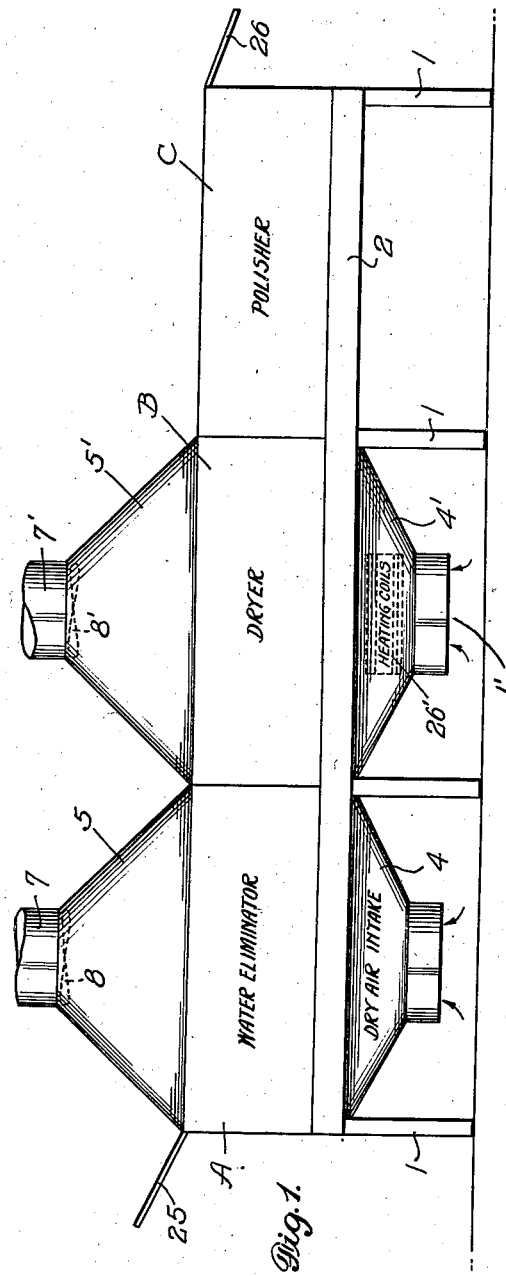
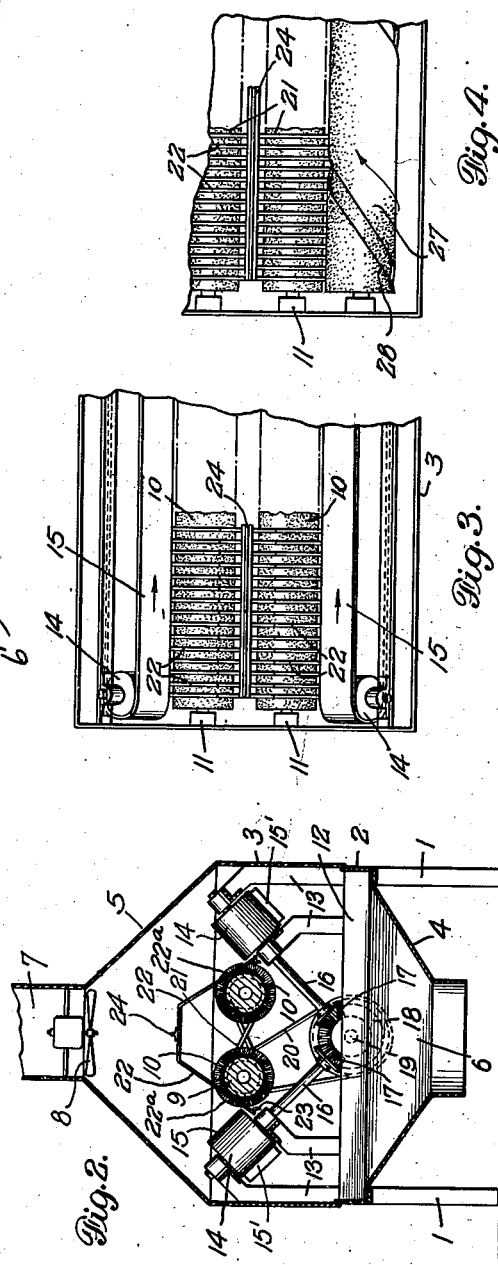
INVENTORS
Mabry D. Kennedy
and J. Gordon Johnson,
BY
Gardner J. O'Boyle
ATTORNEY March 7, 1939.   M. D. KENNEDY ET AL   2,149,443
FRUIT AND VEGETABLE TREATING MACHINE
Filed Feb. 3, 1934    2 Sheets-Sheet 2

INVENTORS
Mabry D. Kennedy
and J. Gordon Johnson,
BY
Gardner J. O'Boyle ATTORNEY Patented Mar. 7, 1939

2,149,443

UNITED STATES PATENT OFFICE 2,149,443

FRUIT AND VEGETABLE TREATING MACHINE

Mabry D. Kennedy and John Gordon Johnson, Orlando, Fla., assignors to Ken-Jon Inc., Orlando, Fla.

Application February 3, 1934, Serial No. 709,636

7 Claims. (Cl. 146—202)

Our invention relates to improved fruit and vegetable treating machines and more particularly to an apparatus for washing, drying and polishing fruit.

An object of the invention is to provide an improved fruit treating unit wherein the steps of washing, drying and polishing of the fruit or vegetables may be carried out in sequence.

Another object of our invention is to provide a fruit or vegetable treating device constructed and arranged so that fruit may be moved longitudinally of the machine and simultaneously contacted with a rotating member adapted to wash, wipe, dry and polish the fruit during its passage through the machine.

Yet another object of our invention is to provide a fruit or vegetable treating machine wherein the centrifugal force developed by a rotating member adapted to contact with the fruit is utilized to free the fruit of moisture during the drying process.

Still another object of our invention is to provide a fruit treating machine having an improved fruit guard arrangement adapted to permit the fruit to contact with a rotatable polishing and drying element and at the same time prevent the fruit from being thrown clear of the rotatable element during its passage through the machine.

A still further object of our invention is to provide a fruit and vegetable treating machine having improved means to support the fruit at a predetermined distance from the horizontal plane of the axis of rotation of a rotatable drying and polishing element, while moving the fruit longitudinally of the machine.

With these and other objects in view, which may be incident to our improvements, the invention consists in the parts and combinations to be hereinafter set forth and claimed with the understanding that the several necessary elements, comprising our invention may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings:

Figure 1 is an elevational view of our improved fruit treating machine.

Fig. 2 is an end view of Figure 1, partly in section.

Fig. 3 is a fragmentary plan view of one end of the machine.

Fig. 4 is a plan view of a modified form of the fruit conveying arrangement.

Figure 5:
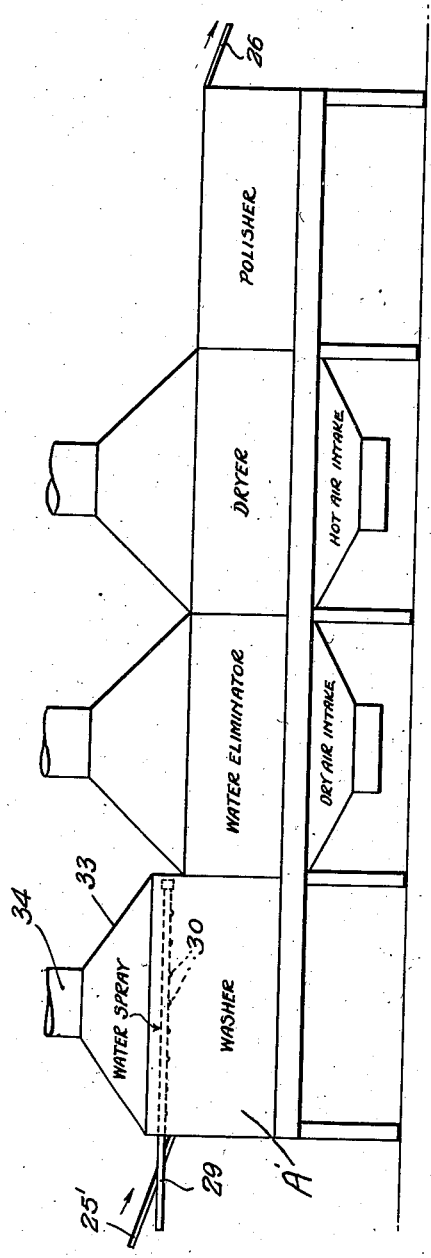
Fig. 5 is an elevational view of our improved fruit treating machine wherein a fruit washing device is used.

Our improved fruit and vegetable treating machine consists essentially of a combination of units comprising a washer, water eliminator, a dryer and a polisher. Mounted within these units and extending longitudinally thereof are a pair of rotatable cylinders having their surfaces formed with suitable brushing material and adjacent the cylinders are two endless belts forming with one side of the brushes, respectively, a trough or valley to receive the fruit to be treated, and providing conveying means to move the fruit longitudinally of the brushes. One of the most important features of our invention is to utilize the centrifugal force developed by the rotating brush, as a means of throwing off the washing liquid which has been withdrawn from the surfaces of the fruit. In order to accomplish this, we provide a suitable guard arrangement for the fruit whereby the fruit is permitted to contact with a substantial portion of the brushing surface while maintaining the fruit a predetermined distance from the axis of rotation of the brush. Of course, the use of one brush and one conveying means is within the purview of the invention.

Referring to the drawings and more particularly Figures 1 and 2 thereof, we have shown our improved fruit treating machine comprising a water eliminator A, a dryer B and polisher C, mounted upon suitable support members 1, to which are attached longitudinal side members 2. The water eliminator is enclosed by means of a hood 3 having top and bottom portions 4 and 5. The bottom of the hood is provided with an air intake opening 6 and in the outlet 7 there is mounted a suitable suction fan 8. The dryer B is enclosed by a hood member having top and bottom portions 4' and 5', the bottom of the hood having an air intake opening 6'. In the outlet 7' there is also mounted a suction fan 8'.

Extending longitudinally of the units are a pair of cylinders 9 having suitable brushing surfaces 10 attached thereto. The brushes are rotatably mounted and supported in suitable bearings 11 attached to the ends of the frame of the machine and at spaced intervals, along the length of the machine, are a plurality of cross members 12 adapted to support hangers 13 which serve as supports for pulleys 14 which carry the endless conveying belts 15, each of which is disposed to form a trough or valley with one side of a brush and into which valley is placed the fruit or other articles to be treated. The pulley shafts are formed with extensions 16 to which are attached gears 17 adapted to mesh with a central gear 18 mounted upon a drive shaft 19. Of course, the machine may comprise one brush 10 and one conveyor 15, if desired.

Gear 18 is formed with a grooved portion adapted to receive belt 20 which is arranged to pass around a pulley formed on the shaft of the cylinder 9. Between these cylinders is a belt 21 fitting into suitable grooves formed at the ends of the cylinder shafts, whereby the cylinders are rotated when rotation is imparted to gear 18 from a single source of power, not shown.

In order to permit the fruit to contact with a substantial portion of the brushing surfaces of the rotating cylinders and at the same time prevent the fruit from being thrown clear of the cylinders when the cylinders are rotated, we have provided a guard arrangement 22 overlying the brush or brushes 10, as the case may be. Broadly, the guard 22 provides a surface above each brush 10 and inclined in the same general direction as the wall or side of the valley provided by its brush and, further, has tines or fingers which extend through the surface of the brush to limit the depth of contact of the fruit with the brush. As shown particularly in Fig. 6, the surface of the guard above the brush is preferably positioned so as to reduce the effective circumferential brushing surface of the brush to an area approximately 45° from the horizontal radius of the brush and lies in a plane which forms a cord through the brush intersecting the periphery of the brush substantially at said horizontal radius. The tines or fingers 22a may lie, and preferably do, as shown, but it is within the scope of the invention for the tines or fingers to have any other position so long as they limit, to a predetermined degree, the depth of contact of the fruit with the brush, such as shown in copending application Serial No. 742,965.

More specifically the guard 22 may comprise a plurality of guide rods, as shown, mounted in spaced relation lengthwise of the machine, but preferably spaced less than the diameter of the fruit or object to be treated. These guide rods may be supported at their lower ends upon suitable brackets 23 attached to one side of the hanger 13 and mounted together and in spaced relation at their upper ends by a member 24 which may be soldered, welded or otherwise fastended to the top portions thereof. It will be noted that the brush surfaces 10 are adapted to extend through the spaces formed between successive guide rods and contact with the surfaces of the fruit as it is carried along the machine by means of the conveyor belts 15.

For the purpose of removing any of the washing liquid which may adhere to the belts 15 suitable rollers, squeegees, or other suitable means 15' are provided. These rollers or squeegees are adapted to press against the surfaces of the belts and serve to clear the belts of residual wash liquid transmitted to them by the fruit.

In the operation of the device, fruit is introduced from platform 25 and is carried along by means of conveyors 15 and contacts with the brushing surfaces of the cylinders 9. In the water eliminator, the fruit may be sprayed with a suitable washing liquid, the liquid being wiped from the surface of the fruit and due to the centrifugal force is thrown tangentially of the brushes. As the fruit is moved along the brushes to the dryer, the residual moisture is withdrawn from the fruit and it is further dried and given a preliminary polishing. From the dryer, the fruit passes to the polisher wherein it is polished and exits along platform 26 ready for packing and shipment. While the fruit is passing through the water eliminator and dryer, excess moisture is removed from the interior of these units by means of the suction fans 8, 8'. In order to assist in thoroughly drying the fruit, a suitable heating arrangement, in the form of an electric heating unit 26' mounted near the bottom of the dryer, may be used.

It will be appreciated that the rotatable cylinders may comprise a plurality of independent members for each unit or they may be made of single cylinders adapted to extend the full length of the machine. The character of the brushing medium attached to the surfaces of the cylinders of course will be varied to meet the requirements of the individual units.

Referring to Figure 3, it will be seen that the conveyors 15 and guard members 22 form a trough adapted to receive the fruit and permit its surfaces to contact with the brushing surfaces of the cylinders. During longitudinal movement of the fruit, it is maintained a predetermined distance from the axes of rotation of the cylinders. By means of this arrangement, the fruit is prevented from being thrown away from the brushes and the movement of the endless belts is such as to constantly change the axis of rotation of each individual fruit so that its entire surface is exposed to the brushing surfaces while passing through the machine.

Referring to Figure 4, we have shown a modified form of fruit conveyor comprising a roller 27 having a spiral 28. In this arrangement, the fruit is supported by the conveying roller 27 and the guard members 22 and when the conveyor is rotated, the fruit is moved longitudinally of the machine.

Referring to Figure 5, there is shown a modification of the arrangement disclosed in Figure 1, wherein a fruit washer A' is used in combination with the other units, namely, a water eliminator A, dryer B and polisher C. In this arrangement, it will be understood that the brushes, fruit guards and conveyors extend into the washer and the fruit is treated with a wash liquid supplied from a suitable pipe 29 having perforations 30 formed therein. The excess washing liquid is removed from the washer by means of a trough, not shown, adapted to discharge into a suitable waste pipe. The top of the washer is covered by means of a hood 33 having an opening 34 whereby the excess moisture is freed to the atmosphere. The operation of the machine is the same as that disclosed in Figure 1, however, in the present arrangement the fruit is thoroughly washed before it passes to the water eliminator A. Fruit is introduced from the platform 25' and while it is being conveyed through the washer by means of the conveyor belts 15, it is sprayed with washing liquid from the supply pipe 29. After the fruit has been washed, it passes through the water eliminator, dryer and polisher, exiting at platform 26, in condition for packing.

Figure 6:
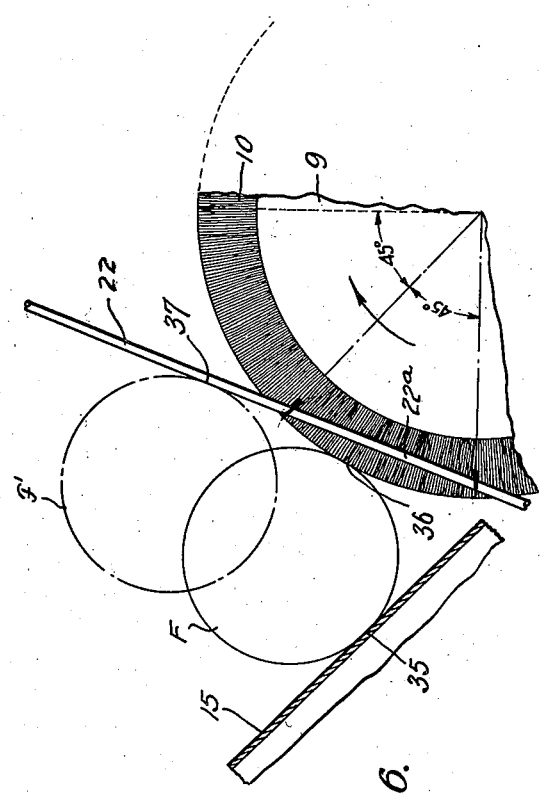
Fig. 6 is a diagrammatic view showing the various positions assumed by an individual fruit in its passage through the machine.

Referring to Figure 6, we have shown a diagrammatic view of the positions assumed by an individual fruit during its passage through the machine. It will be noted that the fruit F, shown in the full line, is tangent to the conveyor 15 at 35 and tangent to the periphery of the brush at a point 36. When the brush is rotated, the fruit is thrown by centrifugal force away from the surface thereof and assumes the position shown at F', the fruit then being tangent to the guard member 22 as at 37.

Due to the relatively high speed of the revolving cylinder, the operations of washing, drying and polishing, by means of our improved apparatus, are accomplished much quicker than in the ordinary type of machine and in a much shorter distance. Owing to the speed of rotation of the cylinder, removal of the water from the fruit after washing and consequent speeding up of the drying action is greatly accelerated. In this connection, it will be noted that the water which is brushed from the surface of the fruit, is thrown by centrifugal force in the form of a fine mist from the brushes into the atmosphere above the cylinder where it is drawn away by suction fans.

Because of the high speed of rotation of the brush 10, fruit passing along in contact with its side is in danger of being thrown violently away from the cylinder surface and out of the machine entirely. If the fruit is not thrown out of the machine, it will probably be tossed around so violently that it would be bruised enough to render it unfit for marketing. By means of our improved guard 22, the fruit is allowed to contact with the rapidly revolving brush at only a limited portion of its surface, i. e. about 45° upwardly from a horizontal radius on the valley side of the brush. If, on account of the centrifugal action, the fruit should move up even a short distance out of its intended position, it is held by the guard 22 from further contact with the brush and hence falls back without injury. The tines 22ª arranged below the surface of the brush prevents the fruit or objects being treated from embedding themselves too far into the brush surface, when the brush has fine or light bristles, and which would produce too great a friction between the fruit and the brush, causing the fruit to be thrown from the machine.

It will be appreciated that while our improved machine has been described as comprising a washer, water eliminator, dryer and polisher, that it is in its broadest concept a fruit dryer of the centrifugal type. Various other mechanical means may be provided for the handling of the fruit, however, the invention in its broadest aspect includes any means of drying fruit by passing it over a high speed brush with means to prevent undue agitation of the fruit.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

What is claimed is:

1. In a fruit washing machine, the combination of a rotatable brush, means to move the fruit longitudinally of the brush comprising an endless belt mounted adjacent the brush, means to wet the fruit with washing liquid during its movement longitudinally of the brush, means positioned between the brush and the endless belt adapted to prevent undue agitation of the fruit by the centrifugal force of the brush, said means comprising a plurality of guide members mounted in spaced relationship with respect to the length of the brush and spaced apart a distance less than the diameter of the fruit, said guide members being located beneath the surface of the brush and adapted to permit the fruit to contact with a chordal portion of the brushing surface, of limited length and of a predetermined depth less than the length of the brush bristles and means to rotate the brush.

2. In a fruit washing machine, the combination of a rotatable brush, means to move the fruit longitudinally of the brush, comprising a spiral roller mounted adjacent the brush, means to wet the fruit with washing liquid during its movement longitudinally of the brush, means positioned between the brush and the fruit conveying roller adapted to prevent excessive agitation of the fruit by the centrifugal force of the brush, said means comprising a plurality of guide members spaced apart a distance less than the diameter of the fruit and mounted in spaced relationship with respect to the length of the brush, said guide members being located beneath the surface of the brush and adapted to permit the fruit to contact with a chordal portion of the brush, of limited length and of a predetermined depth less than the length of the brush bristles and means to rotate the brush.

3. In a fruit treating machine, the combination of a rotatable treating member, conveying means to move the fruit longitudinally of the treating member, means spaced apart a distance less than the diameter of the fruit and located beneath the exterior surface of the treating member and adapted to permit the fruit to contact with a chordal portion of the fruit treating member of limited length and of a predetermined depth, and means to rotate the treating member.

4. In a fruit treating machine, the combination of a rotatable treating member, conveying means to move the fruit longitudinally of the treating member, means spaced apart a distance less than the diameter of the fruit and having portions located beneath the surface of the treating member and adapted to permit the fruit to contact with a chordal portion of the treating member, of limited length and of a predetermined depth, and means to rotate the treating member.

5. In a fruit treating device, a substantially horizontal rotary brush; means for rotating the brush at high speed as will centrifugally discharge liquid adhering thereto, means disposed adjacent the brush forming a fruit receiving valley between it and the brush and including means to operate it at a relatively lower speed than the brush for advancing the fruit along the length of the brush; and a guard overlying the brush on the side thereof forming said valley and having an adjacent portion thereof reducing the effective circumferential brushing area of the brush for contact with the fruit to approximately 45° from a substantially horizontal radial line through the brush upwardly, said reducing portion of said guard having a surface rising from the brush for a distance; and means located beneath the surface of the brush to limit the depth of contact of fruit with the brush.

6. In a fruit treating device, a substantially horizontal rotary brush rotated at relatively high speed; a substantially cylindrical feed member having its axis substantially parallel with and disposed adjacent the brush and its surface forming a fruit receiving valley between it and the brush and operated at a relatively lower speed for advancing the fruit along the length of the brush while the brush exerts a brushing action on the fruit collecting liquid on the fruit surface and discharging said liquid therefrom by centrifugal force; and a guard overlying the brush on the side thereof forming said valley and reducing the effective brushing area of the brush for contact with the fruit to approximately 45° from a horizontal radius thereof upwardly, the forward end of said guard being substantially contiguous to the surface of the brush and defining the upper limit of said brushing area, said forward end of the guard having a surface rising therefrom and positioned with respect to the valley and the brush that should the fruit move out of contact with the brush it will drop by gravity back into the valley, the brushing surface within said effective brushing area being movable upwardly about the axis of the brush.

7. In a fruit treating device, a substantially horizontal rotary brush; conveying means disposed adjacent the brush forming a fruit receiving valley between it and the brush, means for rotating the brush upwardly of the valley at high speed as will centrifugally discharge liquid adhering thereto and to operate said conveying means at a relatively lower speed than the brush for advancing the fruit along the length of the brush; and a guard overlying the brush on the side thereof forming said valley and having an adjacent portion thereof reducing the effective exposed circumferential brushing area of the brush for contact with the fruit to approximately 45° from a substantially horizontal plane through the axis of the brush upwardly; the forward end of said portion of the guard being substantially contiguous the surface of the brush and having a surface rising for a distance from the brush and lying in a plane which forms a chord through said exposed brushing area of the brush.

MABRY D. KENNEDY.
J. GORDON JOHNSON.